United States Patent
Katoh

[11] 3,938,756
[45] Feb. 17, 1976

[54] RECORDING AND/OR REPRODUCING APPARATUS USING A TAPE CASSETTE

[75] Inventor: Hiroshi Katoh, Yokohama, Japan

[73] Assignee: Victor Company of Japan, Limited, Yokohama, Japan

[22] Filed: May 24, 1974

[21] Appl. No.: 473,177

[30] Foreign Application Priority Data
May 25, 1973 Japan............................ 48-57667
June 12, 1973 Japan............................ 48-66201
June 14, 1973 Japan............................ 48-66338
June 14, 1973 Japan............................ 48-66339
June 12, 1973 Japan............................ 48-66200

[52] U.S. Cl................................ 242/188; 360/74
[51] Int. Cl.². B65H 59/38; G03B 1/04; G11B 1/52; G11B 15/06
[58] Field of Search.................. 242/188–191, 242/194; 360/74

[56] References Cited
UNITED STATES PATENTS
3,684,209  8/1972  Wada................................ 242/188
3,759,464  9/1973  Sato................................ 242/188

*Primary Examiner*—Leonard D. Christian

[57] ABSTRACT

An automatically loading recording and/or reproducing apparatus comprises a mechanism which operates at the time of loading. The mechanism draws a tape from a tape cassette and loads it along a specific tape traveling path. At the time of unloading, the mechanism pulls the tape back into the tape cassette. A mechanism locks a fast-forward or rewinding manipulation mechanism so that a driving mechanism cannot be operated when the manipulation mechanism is operated and locked. The locking mechanism activates the apparatus in a tape fast-forward or rewinding operation upon completion of the unloading operation.

9 Claims, 26 Drawing Figures

RECORDING AND/OR REPRODUCING APPARATUS USING A TAPE CASSETTE

BACKGROUND OF THE INVENTION

This invention relates generally to a recording and/or reproducing apparatus using a tape cassette. More particularly, it relates to a recording/reproducing apparatus having means for drawing a tape out of a cassette and loading this tape into a predetermined tape path. A mechanical manipulation mechanism effects various kinds of functions.

A video signal recording/reproducing apparatus uses a tape cassette. The tape is drawn out and loaded into a predetermined tape path. In this type of apparatus, a mechanism control circuit effects various modes of operation successively and automatically.

For instance, in a conventional apparatus of this character, the tape is drawn out of the tape cassette and loaded in the specific tape path. Thereafter, the tape undergoes fast-forward or rewinding. It is necessary during the unloading operation, to pull the tape back into the cassette. The tape bath is complex, and the friction of tape travel is relatively large. In the conventional apparatus, in order to automatically carry out such an operation of converting from the tape unloading to tape fast-forward or rewinding operation, the mechanism control circuit is provided. The above operation depends on the control operation of this control circuit.

SUMMARY OF THE INVENTION

Accordingly, it is a general object of the present invention to provide a novel and useful recording/reproducing apparatus in which the above described difficulties, encountered in the prior art, are overcome.

A specific object of the invention is to provide a recording/reproducing apparatus in which the shifting of the apparatus operation, for example, from the tape unloading mode to the tape fast-forward mode of the tape rewinding mode, can be accomplished automatically by the use of only mechanical means.

Another object of the invention is to provide a recording/reproducing apparatus in which a mechanism on the supply side pulls the tape out and back into the tape cassette, at the time of tape loading and unloading, respectively.

Still another object of the invention is to provide a recordiing/reproducing apparatus in which, rewinding is automaticalllly effected if the tape fast forward is carried out to the terminal end of the tape, at the time of the fast-forward mode of operation.

A further object of the invention is to provide a recording/reproducing apparatus in which the power consumption is minimized for a solenoid used for holding the control manipulation mechanism in one operational mode.

Other objects and further features of the invention will be apparent from the following detailed description when read in conjunction with the accompanying drawings.

DETAILED DESCRIPTION

Figure 1:
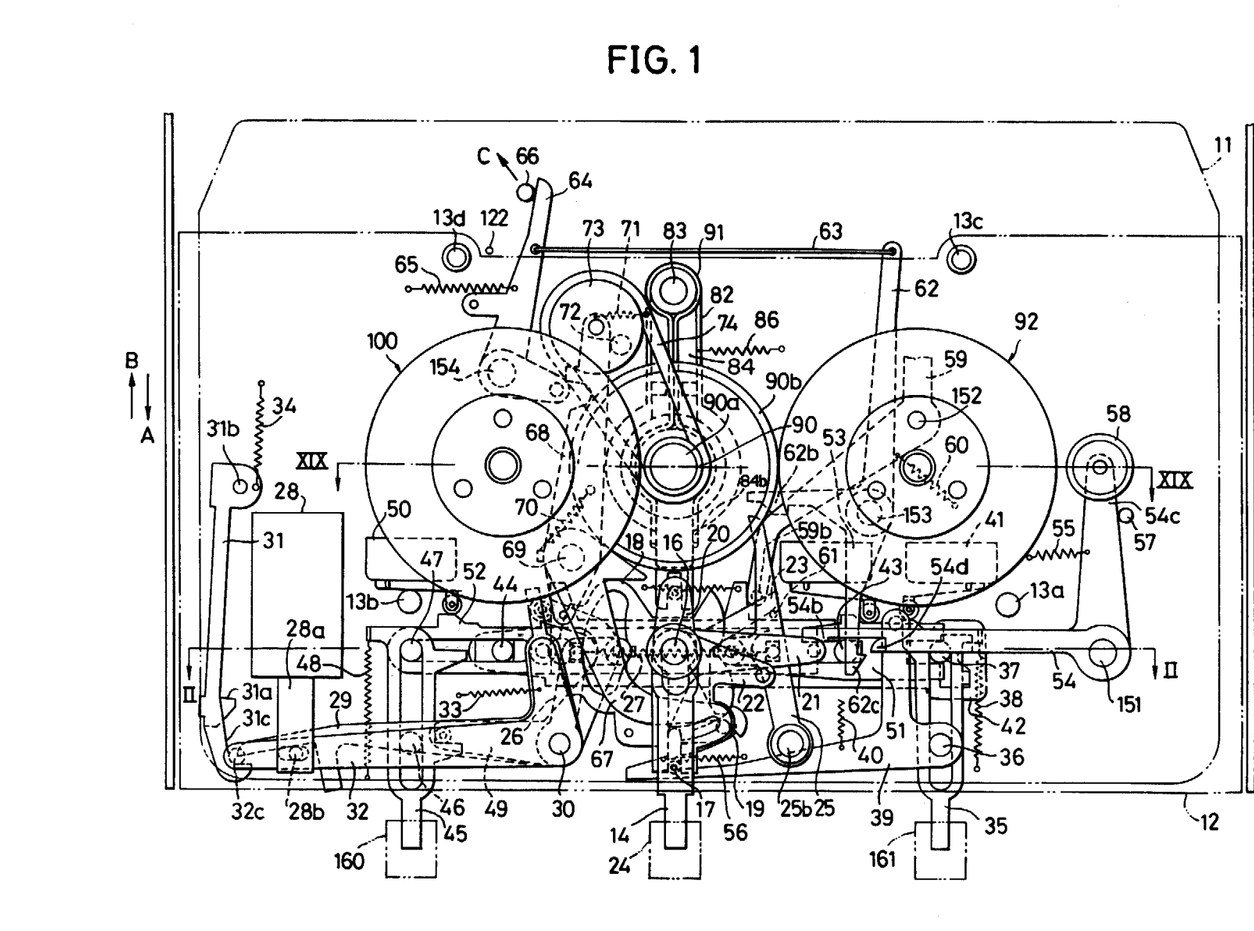
FIG. 1 is a plan view showing essential parts of an embodiment of a recording/reproducing apparatus according to the present invention.
Figure 2:
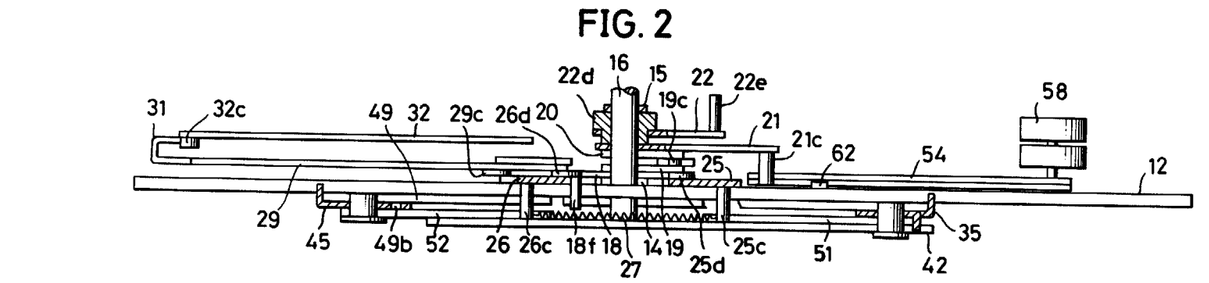
FIG. 2 is a vertical sectional view taken along the line II — II in FIG. 1.
Figure 3:
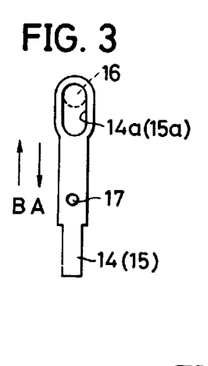
FIG. 3 is a plan view showing a sliding plate.
Figure 4:
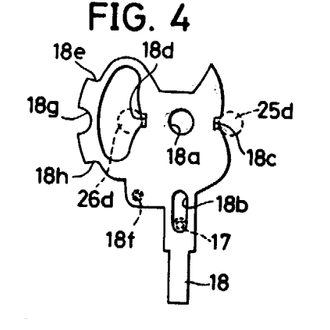
FIG. 4 is a plan view showing a main control cam.
Figure 5:
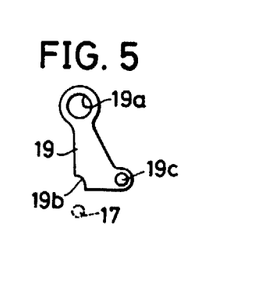
FIG. 5 is a plan view showing a fast-forward drive cam.
Figure 6:
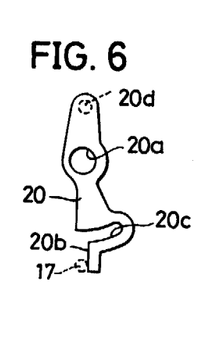
FIG. 6 is a plan view showing a cam for actuating the winding pulley.
Figure 7:
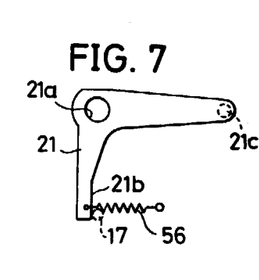
FIG. 7 is a plan view showing a rewind cam.

In FIGS. 1 and 2, a tape cassette 11 is loaded into a specific position by being guided by guide pins 13a through 13d fixed on a sub-chassis 12, provided above a chassis (not shown). Sliding plates 14 and 15, having a shape as illustrated in FIG. 3, are slidably mounted to move in the directions of arrows A and B, and to rotate a shaft 16, at slots 14a and 15a. The plates 14 and 15 are respectively connected together by a connecting pin 17 passing through a slot 18b of a main control cam 18, illustrated in FIG. 4, and they are moved unitarily. A main control cam 18, a fast-forward drive cam 19, a cam 20 for actuating the winding pulley, and a rewind cam 21 are illustrated, respectively, in FIGS. 4 through 7. These cams are rotatably engaged, respectively, at holes 18a, 19a, 20a, 21a, with the shaft 16.

Figure 8:
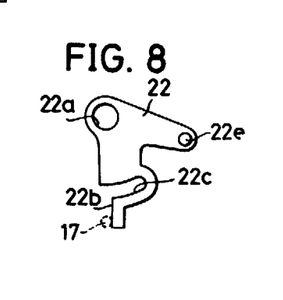
FIG. 8 is a plan view showing a cam for rejecting a tension arm.
Figure 9:
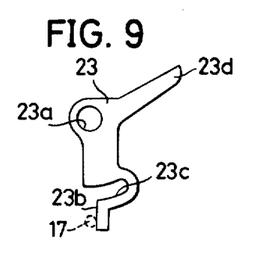
FIG. 9 is a plan view showing a loading selection cam.

A cam 22 for rejecting a tension arm (shown in FIG. 8) is rotatably engaged with the shaft 16, passing through a hole 22a and a collar 22d. Cam 22 is provided with a pin 22e fixed on the upper side, at one extremity thereof. A loading select cam 23 (shown in FIG. 9) is revolvably engaged, at a hole 33a, with the shaft 16.

Each of the above mentioned sliding plates 14 and 15 is provided, at one extremity thereof, with a control knob 24 and is always urged to rotate in the direction of the arrow A (FIG. 3) with a force exerted by a spring (not shown). The knob 24 is rotated in the counterclockwise direction together with the plates 14 and 15.

The cams 18, 20, 22 and 23 are engaged, respectively, at the wall surface of a through hole 18b, and side surfaces 20b, 22b, and 23b engage with the connecting pin 17, and are rotated in the same direction. Moreover, when the knob 24 is rotated in the clockwise direction, the cams 18 and 21 are rotated in the same direction, as they are engaged and pushed, respectively, at the wall surface of the through hole 18b and a side surface 21b. Furthermore, when the knob 24 is slid in the direction of the arrow B and, then rotated in the counterclockwise direction, the cams 18 and 19 are engaged, respectively, at the wall surface of the through-hole 18b and at the side surface 19b, and rotated in the same direction. At this time, the cams 20, 22, and 23, with the pin 17 passing through cutout openings 20c, 22c, and 23c thereof, are prevented from rotating.

Figure 10:
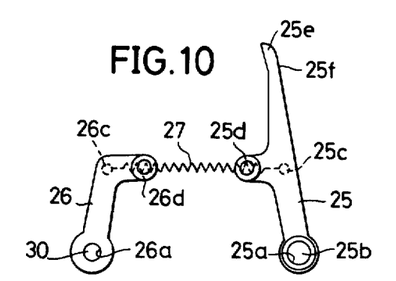
FIG. 10 is a plan view of a pressure arm.

Pressure arms 25 and 26 have a shape as illustrated in FIG. 10. These arms are rotatably engaged respectively with pins 25d and 30 fixed to the sub-chassis 12 by holes 25a and 26a thereof. Moreover, the pressure arms 25 and 26 are urged to rotate in the counterclockwise and the clockwise directions, respectively, by the force of a spring 27 stretched between studs 25c and 26c fixed to the lower surface thereof. Pins (or rollers) 25d and 26d push against cam surfaces 18c and 18d of the cam 18.

Figures 11, 12, 13, 14:
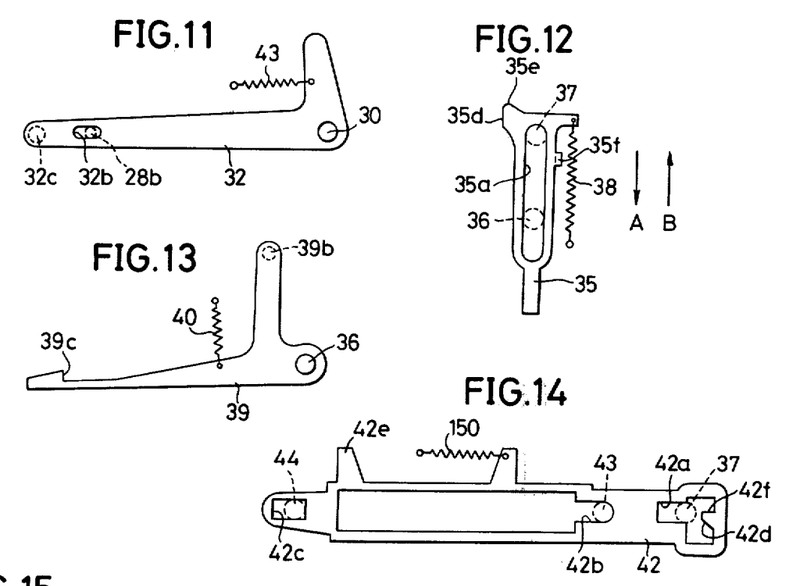
FIG. 11 is a plan view of a release arm.
FIG. 12 is a plan view of a sliding plate for timer-recording.
FIG. 13 is a plan view showing a second lock arm.
FIG. 14 is a plan view showing a lever for rejecting a timer.
Figure 18:
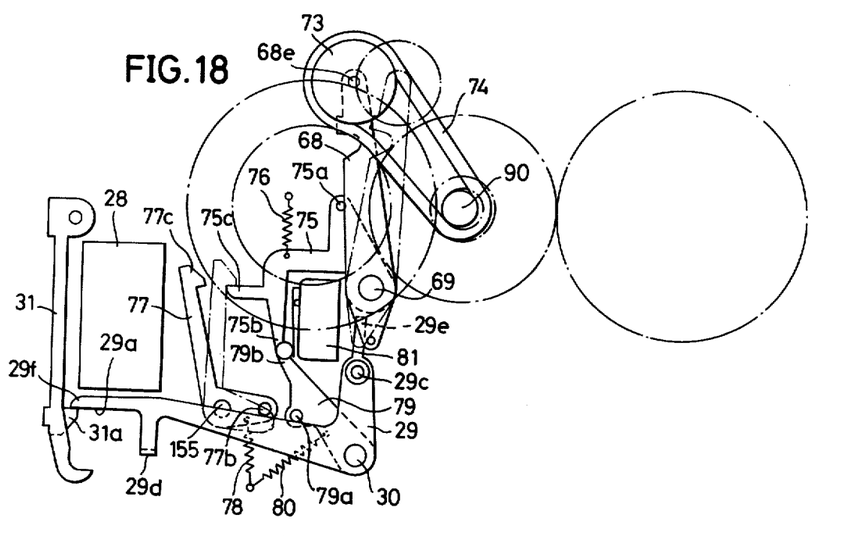
FIG. 18 is a plan view showing a portion of the apparatus in FIG. 1 in the operating state thereof.

A solenoid 28 is provided with a plunger rod 28a. A lock arm 29, having a shape illustrated in FIG. 18, is rotatably engaged with a pin 30. Arm 29 is energized to turn in the counterclockwise direction responsive to springs 78 and 80, but is limited in rotation by the engagement of a side surface 29a thereof with a pin 28b or the plunger rod 28a, at one extremity thereof. A release arm 32, having a shape as illustrated in FIG. 11, is rotatably supported on the pin 30. The arm 32 is urged to turn in the counterclockwise direction by a spring 43, and is positioned by a pin 28b engaged with a slot 32b thereof. A sub-lock arm 31 is rotatably engaged with a pin 21b fixed on the sub-chassis 12. Arm 31 is urged in the counterclockwise direction by a spring 34, as shown in FIG. 1, at one extremity, a slide portion 31c engages a pin 32c fixed to the lower surface of the arm 32, at the extremity thereof.

For timer recording a slide plate 35, having a shape as illustrated in FIG. 12, is engaged with pins 36 and 37 which are fixed to the lower surface of the sub-chassis 12. At a slot 35a, plate 35 is slidable in the directions of the arrows A and B. Moreover, the slide plate 35 is urged in the direction of the arrow A by a spring 38. A second lock arm 39 (shown in FIG. 13) is rotatably engaged with a pin 36 and is urged in the clockwise direction of a spring 40. Rotation is limited by a pin 39b fixed to the lower surface thereof, and at one extremity. Pin 39b is engaged with a cam surface 35d of the slide plate 35. At the other extremity of the arm 39, a hook portion 39a engages a pin 18f of the main control cam 18.

A microswitch 41 is secured on the lower surface of the sub-chassis 12. When the slide plate 35 slides in the direction of the arrow B, an actuater of the microswitch 41 is pushed by distant portion 35e of the slide plate 35. A timer reject lever 42 (shown in FIG. 14) has openings 42a, 42b, and 42c which engage pins 37, 43, and 44 fixed on the lower surface of the subchassis 12. Lever 42 is slidably in the left and right directions, and is urged toward the left by a spring 150. When the slide plate 35 slides in the direction of the arrow B, a bent portion 35f extends downwardly and pushes against an inclined portion 42d of the lever 42, which is thereby slidably moved slightly toward the right. Thereafter, the lever 42 slidably returns toward the left responsive to the force of the spring 150, whereby the slide plate 35 is locked. The bent portion 35f is engaged with a hook portion 42f of the lever 42.

Figure 15:
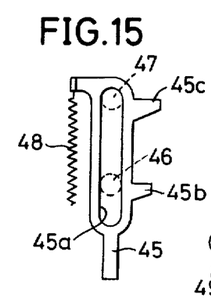
FIG. 15 is a plan view of a stop sliding plate.
Figure 16:
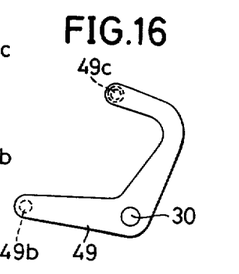
FIG. 16 is a plan view of a connecting arm.

A stop slide plate 45 (shown in FIG. 15) has a slot 45a which engages pins 46 and 47 fixed on the lower surface of the sub-chassis 12. Plate 45 slides in the directions of the arrows A and B. The plate 45 is urged in the direction of the arrow A by a spring 48. A connecting arm 49 (shown in FIG. 16) is rotatably supported on the pin 30. A pin 49b mounted, at one extremity thereof and on the lower surface thereof, abuts against a projection 45b of the slide plate 45. At the same time, a pin 49c mounted at the other extremity thereof and on the lower surface thereof abuts against a projection 42e of the lever 42. A microswitch 50 is secured on the lower surface of the subchassis 12. When the slide plate 45 slides in the direction of the arrow B, an actuater of the microswitch 50 is pushed by a projection 45c thereof, whereby the current supply to the above solenoid 28 is cut off.

Figure 17A:
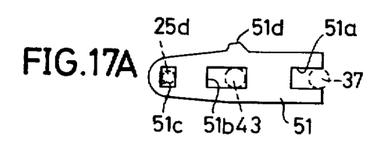
FIGS. 17A and 17B are plan views respectively showing plates for actuating microswitches.
Figure 17B:
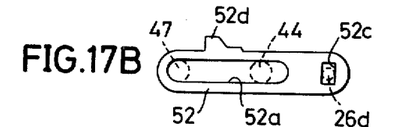

A plate 51 actuates the microswitch (shown in FIG. 17A) when a cutout portion 51a and an opening 51b thereof, engages pins 37 and 43, slidably in the left and right directions. When the arm 25 is rotated in the clockwise direction, the plate 51 is pushed by a stud 25d of the arm 25 loosely engaged with the opening 51c. Plate 51 slides toward the right, whereby the projection 51d thereof pushes the actuater of a microswitch 53 for power supply of the apparatus, which switch is secured on the lower surface of the sub-chassis 12. A plate 52 is provided for actuating the microswitch. At a slot 52a, plate 52 engages pins 44 and 47 to slide plate 52 in the left and right directions. When the pressure arm 26 is turned in the counterclockwise direction, the plate 52 slides toward the left as the stud 26d of the arm 26 loosely engages the opening 52c, whereby a projection 52d thereof separates from the microswitch 50 to change over the connection thereof.

A rewind arm 54 is pivoted on a stud 151 fixed in the sub-chassis 12. Arm 54 is urged to rotate in the counterclockwise direction by a spring 55. At extremity portion 54b thereof, arm 54 is pushed by a pin 21c of the rewind cam 21. Cam 21 is urged to rotate in the counterclockwise direction by a spring 56, whereby the side surface 54c thereof is abutted against a pin 57. A rewind roller 58 is rotatably mounted on the other extremity of the arm 54.

A loading select arm 59 is pivoted on a pin 152 fixed on the lower surface of the sub-chassis 12, arm 59 is urged to rotate in the counterclockwise direction by the spring 60. The arm 59 is positioned at a place where the pin 59b fixed, at one extremity, on the lower surface thereof abuts against a projection 23d of the cam 23. Furthermore the projection 23d abuts against a stop pin 61.

A mode lock cam 62 is pivoted on a pin 153 fixed on the sub-chassis 12. At a first extremity of the cam 62, a cam portion 62b engages and locks a cam portion 25e of the pressure arm 25 at a second extremity thereof, a cam portion 62c engages and locks a cam portion 54d of the rewind arm 54. Furthermore, at a third extremity thereof, the cam 62 is connected with a connecting rod 63 linked to an arm 64. The arm 64 is pivoted on a pin 154 fixed on the upper surface of the sub-chassis 12.

Arm 64 is urged in the counerclockwise direction by a spring 65, one extremity thereof abutting against a pin 66.

Figure 21:
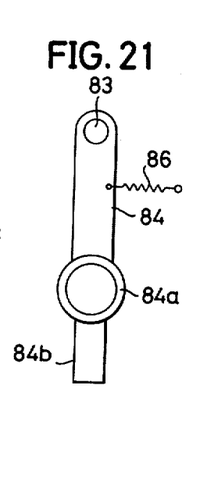
FIG. 21 is a plan view of a winding pulley arm.

Fast-forward arms 67 and 68 (shown in FIG. 23) are pivoted on a pin 69 fixed on the upper surface of the sub-chassis 12. Arms 67, 68 are urged to rotate in the counterclockwise direction, and in the clockwise direction respectively, responsive to the force of a spring 70 stretched between a projection 67a of the arm 67 and a pin 68a of the arm 68. A pin 68b of the arm 68 abuts against the side surface of the arm 57. The arm 68 is urged to rotate in the clockwise direction by a spring 71 and is positioned by the engagement of the side surface thereof with the stop pin 62. The other arm 67 is so positioned that the distant end 67b thereof abuts against a pin 19c fixed on the upper side of the fast-forward drive cam 19. The arm 67 has a projection 67c at a specific position interrelated with a side surface 84b of a rewind pulley arm 84 (shown in FIG. 21), which will be described hereinafter. The arm 68 has a cutout opening 68c and a projection 68d at specific positions which engage a pin 64b of the arm 64.

A fast-forward pulley 73 is rotatably mounted on a pin 68e at the distal end of the arm 68. Arm 68 is rotated in the clockwise direction by the transmission of the rotational power of a three-stage pulley 90, acting through the belt 74.

FIG. 18 is a plan view showing a portion of the apparatus illustrated in FIG. 1, in the operating mode. In FIG. 18, a memory arm 75 is pivoted on a pin 69 and is urged to rotate in the clockwise direction by a spring 76. A pin 75a is abutted against the side surface of the arm 68. A lock arm 77 is pivoted on a pin 155 and is urged to rotate in the clockwise direction by a spring 78. A pin 77b is abutted against the side wall of the arm 29. The arm 77 has a hook portion 77c for engaging a projection 75c on the arm 75.

A holding arm 79 is pivoted on the pin 30 and is urged by a spring 80 to rotate in the counterclockwise direction. A pin 79a is abutted against the side surface of the arm 29. The actuater of a microswitch 81 is pushed by the distant ends of the arms 65 and 69, when the arms 65 and 69 are rotated respectively in the counterclockwise and clockwise directions.

Figure 19:
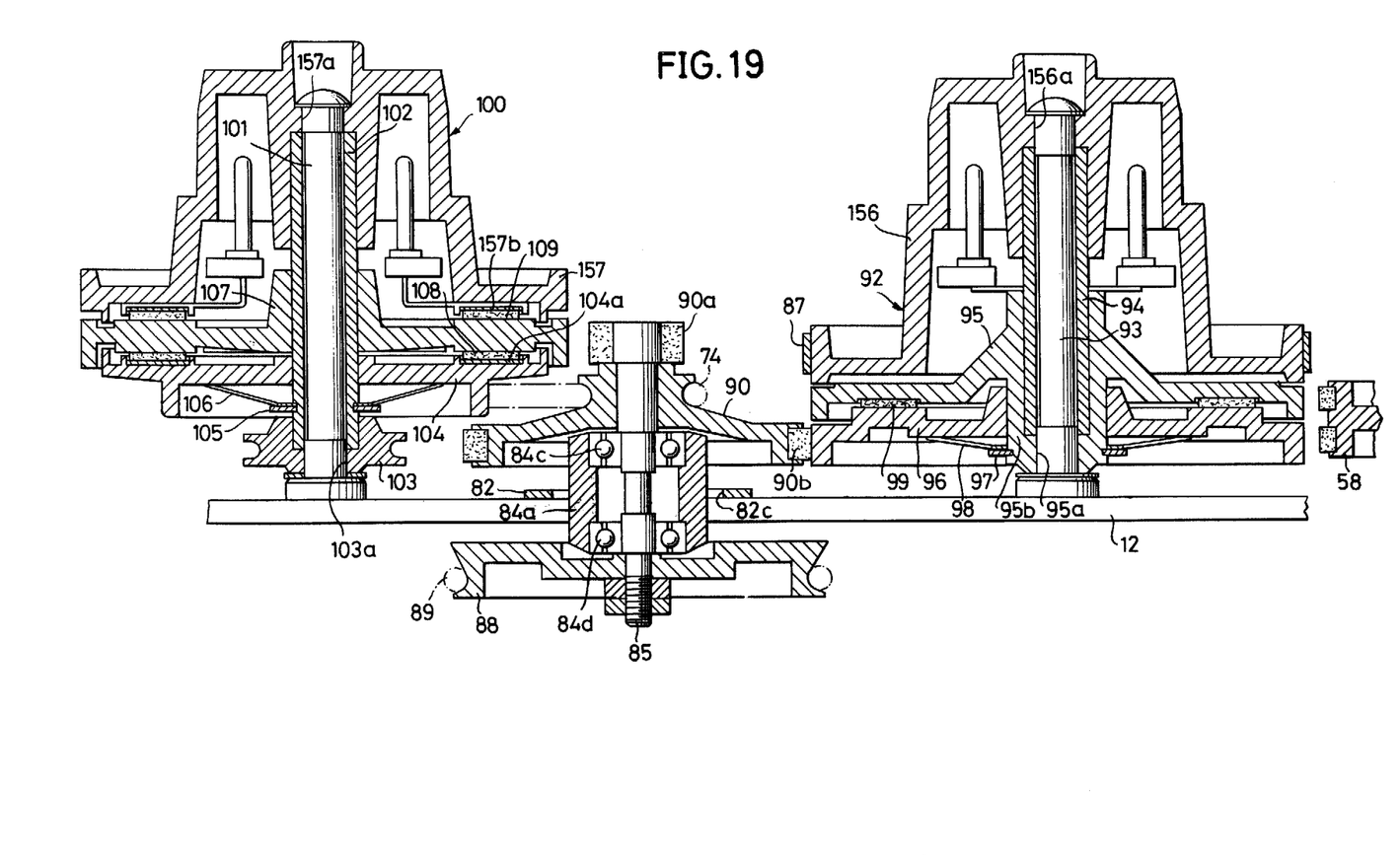
FIG. 19 is a vertical section taken along the line XIX — XIX in FIG. 1 showing a reel drive mechanism.
Figure 20:
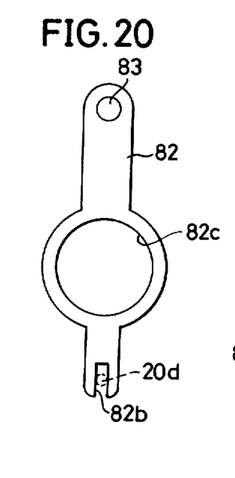
FIG. 20 is a plan view of a winding pulley plate.

The organization of the reel drive mechanism will be described in conjunction with FIG. 19. A winding pulley plate 82 (shown in FIG. 20) is pivoted on a pin 83 and is positioned so that a pin 20d loosely engages a cutout opening 82b at one end of the plate 82. The plate 82 has a central portion with a hole 82c. A winding pulley arm 84 (shown in FIG. 21) is pivoted on a pin 83. A journal portion 84c (shown in FIG. 19) is provided at the center thereof and rotatably supports a rotating shaft 85 by means of bearings 84c and 84d. Spring 86 urges the arm 84 to rotate in the counterclockwise direction as viewed in FIG. 1, whereby a rewind roller 90b is abutted against a clutch disc 96 of a supply reel disc assembly 92. The above described journal portion 84a passes through a hole 82c in the plate 82 and the sub-chassis 12. However, the arm 84 may be rotated within a specific angular range irrespective of the rotation of the plate 72 because the external diameter 84a of the journal portion 84a is smaller than the internal diameter of the hole 82c.

A pulley 88 is mounted on the rotating shaft, at the lower part thereof, and is rotated by a motor (not shown) for driving the reel by way of a belt 89. The three-stage pulley 90 is secured to the rotating shaft 85, at the upper part thereof. Pulley 90 is integral with a drive roller 90a and a rewind roller 90b, at the upper and lower parts thereof, respectively. Furthermore, belt 74 transmits the rotation of a pulley 73.

Figure 22:
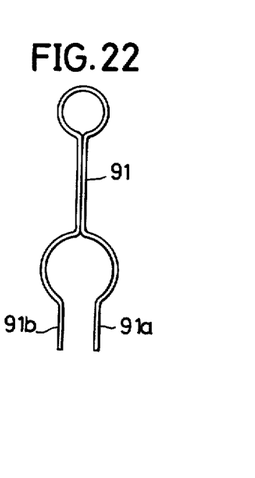
FIG. 22 is a plan view showing a pressure spring.

A pressure spring 91 with a couple of arm portions 91a and 91b (shown in FIG. 22), is loaded on an arm 84 and clamps the plate 82 and arm 84. Hence, the position of the arm 84 is restricted with respect to the plate 82.

A reel holder 156, of the supply reel disc assembly 92, is rotatably supported on a shaft 93 by a bearing 156a. Reel 92 rotates unitarily with a rewind drive disc 95. The bearing 95a, which functions as a journal on the shaft 93 is fitted through a sleeve 94, pivoted on the shaft 93. A clutch disc 96 rotatably engages a cylindrical portion 95b of the disc 95 and is urged upwardly by a leaf spring 98 held by an E-washer 97. Clutch 96 is pressed against the disc 95 through a felt member 99. When the rewind arm 54 is rotated in the counterclockwise direction as viewed in FIG. 1, the rewind roller 58 presses against the discs 95 and 96. A band brake 87, for controlling the tape back tension, encircles the supply reel holder 156.

A reel holder 157 is rotatably supported on a shaft 101 passing through a bearing 157a. Holder 157 rotates unitarily with a counter pulley 103, the bearing 103a of which is fitted on the shaft 101, passing through a sleeve 102. A fast-forward disc 104 is engaged with the sleeve 102 in such a manner that it slides freely in the axial direction of the sleeve 102, and rotates together therewith. Disc 104 is urged upwardly by the force of a leaf spring 106 held by an E-washer 105. Disc 104 is pressed against a clutch disc 107, engaged rotatably and slidably up and down with the sleeve 102, with pressure applied through a plate 104a and a felt member 108 positioned on the upper surface of the disc 104. A clutch disc 107 presses through a felt member 109 and a plate 157b against the holder 157.

Figure 23:
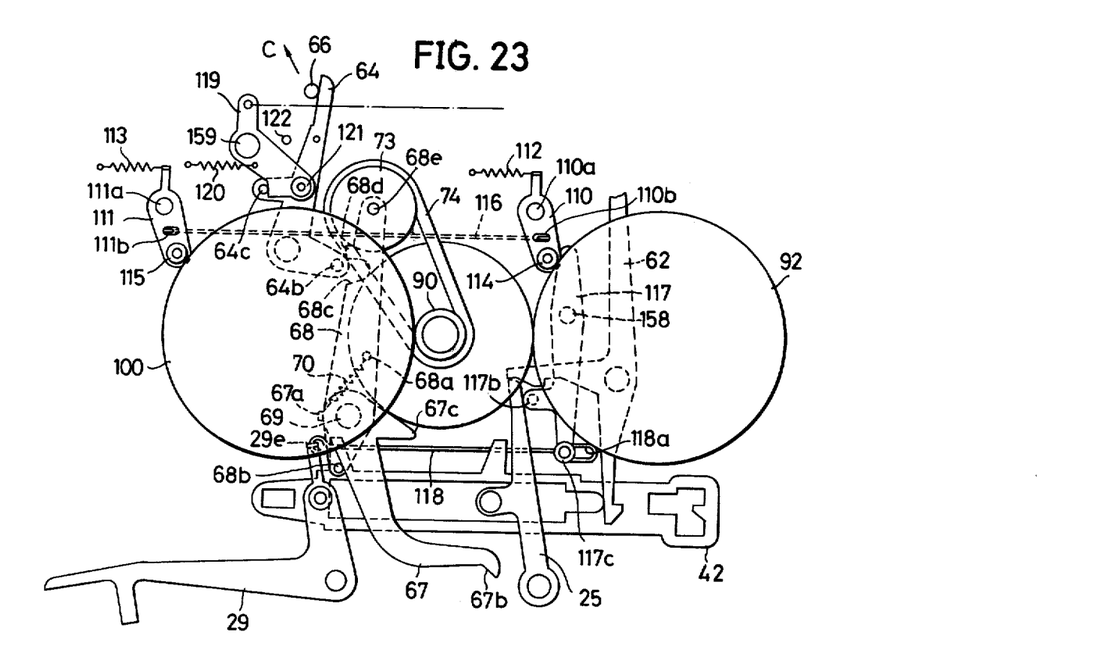
FIG. 23 is a plan view showing a brake mechanism of the apparatus illustrated in FIG. 1.

The organization of the brake mechanism will be described in conjunction with FIG. 23. Brake arms 110 and 111 are pivoted, respectively, on pins 110a and 111a fixed on the sub-chassis 12 and urged to rotate in the counterclockwise direction by springs 112 and 113. Brake shoes 114 and 115 at distant ends of arms 110, 111 press against the reel disc assemblies 92 and 100. Moreover, the brake arms 110 and 111 are linked by a connecting rod 116 which is engaged at each of its ends with slots 110b and 111b, with a slight play. Arms 110, 111 are thereby rotated unitarily within a specific angular range.

A brake reject arm 117 is pivoted on a pin 158 and is urged to rotate in the clockwise direction by abutting against the arm 110, at one distant end of the arm 117 to transmit the force of the springs 112 and 113, and press a pin 117b against the pressure arm 25, at one side surface thereof. Furthermore, a pin 117b fixed on the arm 117 engages a slot 118a on one end of a connecting rod 118. The other end of rod 118 is supported on a hook portion 29e of the lock arm 29. A brake arm 119 is pivoted on a pin 159 and is urged to rotate in the clockwise direction by a spring 120. The side surface of arm 119 engages a pin 64c fixed on the arm 64. At one end of the brake arm 119, a brake shoe 121 imparts a brake force to the take-up reel disc assembly 100.

Next, the operation of the apparatus which is organized as described above will be described for each of its modes of operation.

1. Recording Mode or Reproducing Mode

The manipulation of the control knob 24 in the counterclockwise direction causes the winding pulley actuating cam 20, tension arm reject cam 22, loading select cam 23, and main control cam 18 to be turned through the pin 17 together with the sliding plates 14 and 15.

As a result of the rotation of the cam 20, the winding pulley plate 82 is pushed by the pin 20d of the cam 20. Cam 20 turns in the clockwise direction and presses the drive roller 90a against the clutch disc of the take-up reel disc assembly 100. At this time, the reel disc assembly 100 is being acted upon by the brake force. The brake force is released at a moment when the pinch roller (not shown) starts to be driven. As a result of the rotation of the cam 22, the pin 22e pushes a connecting rod (not shown) which is linked with a tape back-tension control mechanism of the apparatus. The above mechanism is operated for imparting the tension force to the tape. Furthermore, as a result of the rotation of the cam 23, the loading select arm 59 is turned in the clockwise direction which is counter to the force of the spring 60. The loading mechanism of the apparatus assumes a state wherein the loading operation is possible. Moreover, the turning of the cam 18 causes the pressure arms 25 and 26 to be turned in the clockwise and counterclockwise directions respectively.

As a result of the turning of the arm 25, the plate 51 is pushed by the pin 25c of the arm 25 and slides toward the right. The projection 51d pushes the microswitch 53 to switch it "ON", whereby electric power is supplied to the apparatus. On the other hand, as a result of the turning of the arm 26, the plate 52 is pushed by the pin 26c of the arm 26 and slides in the leftward direction. The projection 52d separates from the microswitch 50 to switch it "ON", whereby actuating electric power is supplied to the solenoid 28.

The plunger rod 28a slides in the direction of the arrow B responsive to the action of the solenoid 28. The lock arm 29 and release arm 32 are both turned in the clockwise direction through the pin 28b the projection 29f of the arm 29 is engaged with the hook portion 31a of the sub-lock arm 31, whereby the arm 29 is locked. Turning the arm 29 causes the microswitch (not shown) to be changed over responsive to the pushing of the bent portion 29d of the arm 29. The current into the solenoid 28 is reduced. However, the rotational force urging the cam 18 to return to the original position, in the clockwise direction, is transmitted to the arm 29 through the pin 29c, and is reduced by the frictional force between the projection 29f and the hook portion 31a of the arm 31. Accordingly, a relatively small value of the attraction force of the solenoid 28 is sufficient to save electric power consumed by the solenoid 28.

As a result of the supply of the aforementioned electric power, the loading mechanism of the apparatus is operated to initiate loading operation. The loading arm pin 66 moves in the direction of the arrow C and draws the tape out of the cassette 11 and, thereafter, into a specific tape path. The arm 64 is turned in the counterclockwise direction by the spring 65 and is stopped by its engagement with the pin 122. The turning of the arm 64 causes the mode lock cam 62 to be turned in the counterclockwise direction by the rod 63. The cam portion 62 engages the cam portion 25e of the arm 25 and locks the arm 25.

Accordingly, after performing the loading operation of drawing the tape out of the cassete 11 and placing the tape in the specific tape path, the apparatus is changed over to the play mode or recording mode.

On the other hand, the arm 25 is turned in the clockwise direction, as described hereinbefore, due to rotation of the control knob 24 in the counterclockwise direction. The arm 117 is rotated in the counterclockwise direction. As a result of the turning of the arm 117, the arm 110 is rotated in the counterclockwise direction. The brake force imparted upon the disc 95 by the brake shoe 114 is removed. Furthermore, the arm 111 is rotated in the clockwise direction responsive to the rod 116 following the rotation of the arm 110. The brake force imparted to the reel holder 157 by the brake shoe 115 is also removed. At the same time, the arm 64 is turned in the counterclockwise direction, as described hereinbefore. In response to the shift of the pin 66 in the direction of the arrow C, the arm 119 is rotated in the clockwise direction responsive to the force of the spring 120. The brake shoe 121 presses against the reel holder 157, whereby a brake force is applied thereto. Moreover, because the operation for removing the brake force by the aforementioned brake shoe 115 is slightly delayed by the play in the rod 116, the brake force is already imparted to the reel holder 157 by the brake shoe 121.

Accordingly, the reel holder 157 is never rotated by the brake shoe 121 acting thereon. Despite the rotational force of the three-stage pulley 80 transmitted to the holder 157, during the loading operation, the tape is only drawn out of the supply reel of the cassette 11, and there is no shifting of the tape to the takeup reel.

Moreover, even if the operator erroneously turns the control knob 24 in the counterclockwise direction and further pushes it in the direction of the arrow B, the control knob 24 will never be moved in this direction because of the abutment of the pin 17 against the side surface of the fast-forward drive cam 19. Consequently, the above mentioned erroneous manipulation is prevented.

2. From Recording or Reproducing Mode to Stop Mode via Unloading Mode

The pushing manipulation of a stop button 160 moves the slide plate 45 in the direction of the arrow B and causes the microswitch 50 to be pushed by the projection 45c of the plate 45. The current supply to the microswitch 50 is terminated. When the solenoid 28 is deenergized, the rod 28a slides in the direction of the arrow A. The release arm 32 is rotated in the counterclockwise direction by the force of the spring 33. As a result of the turning of the arm 32, the sub-lock arm 31 is pushed at the portion 31c by the pin 32c of the arm 32 and is turned in the clockwise direction. The projection 29f of the lock arm 29 is thereby released from its locked state by the hook portion 31a of the arm 31. Accordingly, the arm 29 is turned by the force of the springs 78 and 80 in the counterclockwise direction. The cam surface 18e of the cam 18 in the locked state is released. Therefore, the cam 18 is turned in the clockwise direction, together with the plates 14 and 15, responsive to the force of the spring 27 of the pressure arms 25 and 26. The arm 26 is rotated in the clockwise direction and is returned to its original position where the pin 26d engages with the cam surface 18d. On the other hand, the arm 25 is held in the locked state by the mode lock cam 62 as described hereinbefore. The microswitch 53 switches "ON" as it is pushed by the plate 51, whereby the electric power supply to the apparatus is maintained.

Accordingly, when the stop button 160 is released, the slide plate 45 slides and returns in the direction of the arrow A responsive to the force of the spring 48. The pushing state of the projection 45c against the microswitch 50 is thereby terminated. At this time, however, the plate 52 slides and returns toward the right, together with the rotation of the arm 26 in the clockwise direction. The microswitch 50 is engaged and pushed by the projection 52d of the plate 52. Therefore, the microswitch 50 is held in its "OFF" state, whereby no current is supplied to the solenoid 28.

As a result of the turning of the pin 17 in the clockwise direction, the cam 23 rotates in the clockwise direction because of the rotational force of the arm 59 which is urged to rotate in the counterclockwise direction by the force of the spring 60. At this time, the arm 59 is turned in the counterclockwise direction. The loading mechanism of the apparatus is thereby changed over from loading to unloading. As another result of the turning of the pin 17, the cam 20 is rotated in the clockwise direction by the rotational force of the plate 82, which is being urged to rotate in the counterclockwise direction by the force of the spring 86. The drive roller 90a separates from the clutch disc 107 of the take-up reel disc assembly 100. The rewind roller 90b presses against the rewind drive disc 95 of the supply reel disc assembly 92. As still another result of the turning of the pin 17, the cam 22 is turned in the clockwise direction. The mechanism for controlling the tape back tension of the apparatus is thereby rendered inoperative. Consequently, in a primary stage, the apparatus assumes the unloading mode state and the tape is taken into the cassette 11.

On the other hand, the arms 110 and 111 are both held in the state where the brake force is removed, as described hereinbefore. The arm 25 is locked by the cam 62. Following the termination of the pressing of the pinch roller against the capstan, the arm 119 is immediately rotated in the clockwise direction. Therefore, the brake shoe 121 is pressed against the reel disc assembly 100 to impart a brake force thereto. Accordingly, during the unloading period, the tape, which has been drawn out of the cassette in the loading operation, is wholly wound on the supply reel of the cassette 11, and no tape is paid out of the take-up reel.

When the above described unloading operation reaches a state short of its completion, the pin 66 strikes against the arm 64, and the arm 64 is rotated in the clockwise direction. The rotation of the arm 64 to its original position causes the cam 62 to be rotated through the rod 63 in the clockwise direction, and the arm 25 is thereby unlocked from the cam portion 62d. Accordingly, the arm 25 is turned in the counterclockwise direction responsive to the spring 27. The plate 51 slides through the pin 25c, in the left direction, to its original position. Therefore, the projection 51d of the plate 51 separates from the microswitch 53 to switch it "OFF", and the current supply to the apparatus is thereby terminated.

Consequently, in a secondary stage, the apparatus is changed to the stop mode when the unloading operation is completed.

3. From Recording or Reproducing Mode to Rewind Mode via Unloading Mode

The control knob 24, which has returned to its original position at the time of unloading as described hereinbefore, is turned in the clockwise direction. The rotation of the knob 24 in the clockwise direction causes the cams 18 and 21 to be turned in the same direction, together with the plates 14 and 15. As a result of the turning of the cam 18, the arm 26 is pushed, at the pin 26d thereof, by the cam surface 18d of the cam 18 and is rotated in the counterclockwise direction. At this moment, the arm 25 is locked, at the cam portion 25e, by the cam 62 and is positioned to rotate in the clockwise direction, as described hereinbefore. As a result of the turning of the arm 26, the plate 52 slides in the left direction, and the microswitch 50 is switched "ON" as described hereinbefore. The operational electric power is supplied to the solenoid 28. Accordingly, the arm 29 is rotated in the clockwise direction, whereby the cam 18 is locked in its rotated position.

As a result of the turning of the cam 21, the arm 54 is released from its engagement at the end 54b thereof by the pin 21c. Arm 54 is urged to rotate in the counterclockwise direction, but it is not permitted to rotate because the arm 54 is engaged, at the cam portion 54d, with the cam portion 62c of the cam 62. Thus, the apparatus continues its unloading mode operation while it is kept in the state capable of fast-forwarding.

When the unloading operation of the apparatus is completed in this state, the pin 66 strikes and rotates the arm 64 and the cam 62 in the clockwise direction. The rotation of the cam 62 releases the arm 54 from the locking action with respect to the cam portion 54d. Then the arm 54 is turned in the counterclockwise direction by the spring 55. Therefore, the roller 58 presses against both of the discs 95 and 96. At this moment, the cam 62 releases the arm 25 from the locking state with respect to the cam portion 25e. Arm 25 is rotated by its engagement, at the pin 25d, with the cam surface 18c of the cam 18. Therefore, the microswitch 53 is held "ON", whereby the electric power is continuously supplied to the apparatus.

Consequently, the apparatus is changed to the rewind mode in response to the completion of the unloading mode.

4. Normal Rewind Mode

The clockwise manipulation of the control knob 24 causes the cams 21 and 18 to turn in the same direction, as described hereinbefore. As a result of the rotation of the cam 21, the arm 54 is released from its engagement with the cam 21. Arm 54 is rotated counterclockwise responsive to the force of the spring 55. The roller 48 presses against both of the discs 85 and 86. As a result of the rotation of the cam 18, the arms 25 and 26 are rotated in the clockwise and counterclockwise directions respectively. The microswitches 53 and 50 are switched "ON", whereby the power current and the operational power are respectively supplied to the apparatus and the solenoid 28. The actuation of the solenoid 28 rotates the arms 29 and 32 in the clockwise direction, whereby the arm 29 is locked by the arm 31, and the cam 18 is locked. Furthermore, the microswitch (not shown) is changed over, to reduce the current flowing to the solenoid 28. Consequently, the apparatus assumes the rewind mode.

Additionally, the rewind mode operation is similar to the mode as described above even if the control knob 24 is moved in the direction of the arrow B and rotated in the clockwise direction.

When the stop button 160 is pushed, the apparatus, is changed from the rewind mode to the stop mode.

5. Fast-Forward Mode

The control knob 24 is slid in the direction of the arrow B and rotated in the counterclockwise direction. This causes the cams 19 and 18 and plates 14 and 15 to turn in the clockwise direction, as described hereinbefore. As a result of the rotation of the cam 19, the arms 67 and 68 are rotated in the counterclockwise direction, by the force of the spring 70 acting counter to the force of the spring 71. At this moment, the arm 64 is positioned as illustrated in FIGS. 1 and 23 so that the pin 64b may enter the cutout opening 68c of the arm 65, whereby the arm 68 is not prevented from turning, as described hereinbefore.

The rotation of the arm 68 causes the arm 84 to swing in the clockwise direction, together with the three-stage pulley 90. Arm 84 is swung by the tension of the belt 74, which tension is caused by the shift of the pulley 73, when the arm 68 rotates. The arm 84 is now positioned at a specific location where its end surface 84b engages the projection at the end of the fast-forward arm 67, which has rotated as described hereinbefore. Specifically, the three-stage pulley 90 is positioned where the roller 90b and the drive roller 90a are disposed away from the discs 96 and 107, respectively. Furthermore, the rotation of the arm 68 causes the pulley 73 to be pressed against the disc 104, as the pulley 73 is being rotated in the clockwise direction by the power of the three-stage pulley 90 transmitted through the belt 74.

When the cam 18 is turned, electric power is supplied to the apparatus, and the solenoid 28 is actuated. Accordingly, the arm 29 is rotated and is locked by the arm 31, and the cam 18 is locked. Furthermore, the microswitch (not shown) is changed over. The current to the solenoid 28 is reduced. Consequently, the apparatus assumes the fast-forward mode.

6. From Fast-Forward Mode to Stop Mode

First, as a result of the above described turning of the arm 68, the arm 75 is rotated in the counterclockwise direction. The microswitch 81 is pushed and switched "ON". At this time, the rotation of the arm 29 turns the arm 77 in the counterclockwise direction. The projection 75c of the arm 75 is released from its locked state by the hook portion 77c of the arm 77. Moreover, the arm 79 has been rotated clockwise. The microswitch 81 is switched "ON" when pushed by the extremity portion 79b of the arm 79.

The stop button 161 is pushed, and the microswitch 50 is switched "OFF" to cut off the current supply to the solenoid 28. When the solenoid 28 is released, the arm 29 is turned in the counterclockwise direction, and the arm 77 is rotated in the clockwise direction by the force of the spring 78. The arm 75 is locked by the engagement, at the projection 75c, with the hook portion 77c of the arm 77.

At this time, however, the cam 18 is not released from its locked state by the arm 29. The arms 67 and 68 are held in their rotated positions, as described hereinbefore. Accordingly, the memory arm 75 locked by the arm 77 pushes the microswitch 81 and holds it "ON".

Therefore, as described hereinbefore, as a result of the rotation of the arm 29, the cam 18 is released from its locked state and is returned to its original position. The fast-forward arms 67 and 68 also return to their original positions. Consequently, the apparatus is changed over from the fast-forward mode to the stop mode.

7. From Recording or Reproducing Mode to Fast-Forward Mode via Unloading Mode During the aforementioned unloading mode, the control knob 24, which has returned to its original position, is pushed in the direction of the arrow B and then rotated in the counterclockwise direction. This manipulation causes the cams 19 and 18 to be rotated in the counterclockwise direction, together with plates 14 and 15. When the cam 19 is turned, the arm 67 is rotated in the counterclockwise direction as described hereinbefore. However, the arm 68 is not rotated after the rotation of the arm 67. Arm 68 is in the original position illustrated in FIGS. 1 and 23, as described hereinbefore. The projection 68d engages the pin 64b of the arm 64, which is turned in the counterclockwise direction during the unloading mode. Accordingly, the arm 84 and the three-stage pulley 90 are not shifted. The roller 90b is kept pressing the disc 96, whereby the apparatus continues in the unloading mode and is capable of rewinding.

When the unloading operation is completed, the arm pin 66 strikes against the arm 64, which is thereby rotated in the clockwise direction. Arm 64 returns to its original position illustrated in FIGS. 1 and 23. The arm 68 is released from its engagement, at the projection 68d, with the arm 64, and is turned in the counterclockwise direction by the force of the spring 70 acting counter to the force of the spring 71.

Thereafter, as is apparent from the above description, the apparatus is changed over to the fast-forward mode from the unloading mode.

8. From Fast-Forward Mode to Auto Rewind Mode via Stop Mode

Figures 24, 25:
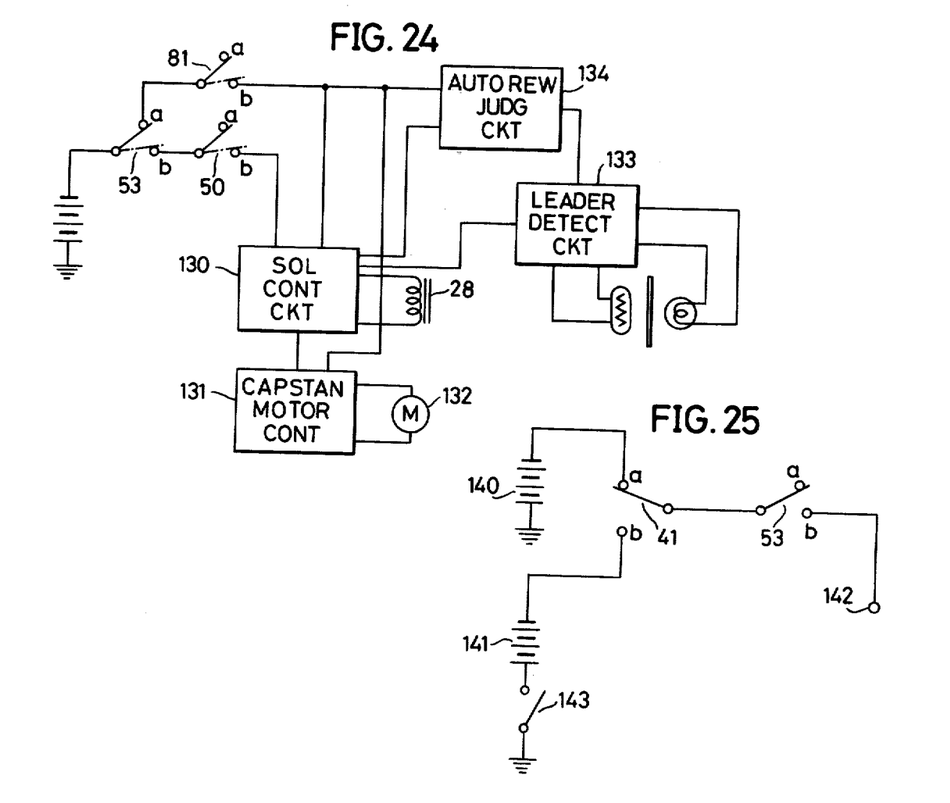
FIG. 24 is a block circuit diagram of a circuit for controlling the auto-rewinding mechanism of the apparatus shown in FIG. 1.
FIG. 25 is a circuit diagram showing a switch connecting state of a circuit for the time recording apparatus.

FIG. 24 shows the block diagram of a circuit for an auto rewind mechanism incorporated within the recording and reproducing apparatus illustrated in FIG. 1. In FIG. 24, the constituent parts similar to those illustrated in FIG. 1 are designated by like reference numerals.

The microswitches 53 and 54 are normally connected to a contact a and are changed over to a contact b, when pushed. The microswitch 50 is normally connected to a contact a and is changed over to contact b, when released. A solenoid control circuit 130 cuts off the current to the solenoid 28. A capstan motor control circuit 131 cuts off the current to a capstan motor 132. A circuit 133 for detecting the tape leader comprises a lamp and phototransistor, for instance, which indicates whether or not the tape portion being detected is the leader portion. An auto rewind judging circuit 134 is supplied with a current through the microswitch 53 connected to the contact a and another microswitch 81 connected to the contact b. Circuit 134 is activated in response to detection of the tape leader by the circuit 133. The solenoid control circuit 130 and capstan motor control circuit 131 place the apparatus in the auto rewind mode for specific periods of time (for instance about 5 seconds). In response to the absence of a leader detection signal from the circuit 133, the solenoid control circuit 130 operates only once, and then for an extremely short period.

When the apparatus is changed over from the fast-forward mode to the stop mode, and the tape reaches its end, the leader portion detection circuit 133 detects the leader portion of the tape. The output signal from circuit 133 is supplied to the auto rewind judging circuit 134. The circuit 134 also receives current from the power source by way of the microswitches 53 and 81 connected to their contacts a and b, respectively. Circuit 134 operates the control circuit 130 and 131 for a specific period of time. In this stop mode of the apparatus, the rewind roller 90b is pressed against the disc 96.

Consequently, the apparatus is changed over from the stop mode to the auto rewind mode.

In this state, arm 29 rotates in the clockwise direction due to the actuation of the solenoid 28 as illustrated in FIG. 18. The arm 79 is rotated in the same direction counter to the force of the spring 78. The arm 75 is released by the hook portion 77c and is thereby unlocked. The releasing of the arm 85 by the arm 78 occurs slightly after the arm 79 pushes the microswitch 81. At this time, the cam 18 is locked at its original position by engagement, at the cam surface 18g, with the pin 29c of the arm 29. Therefore, it is impossible to manipulate the control knob 24 is any direction, in this state.

On being released by the arm 78, the arm 75 is turned in the clockwise direction by the force of the spring 76. The end 75b is no longer pushed against the microswitch 81. The arm 68 is engaged, at its side surface, with the pin 75a of the arm 75 and is rotated to its original position. The microswitch 81 is not pushed by the arm 75, but is being pushed by the arm 79 to close the contact b. Accordingly, the apparatus continues the rewinding operation.

When the current supply to the solenoid 28 is terminated after the apparatus performs its rewinding operation for a specific period of time, the lock arm 29 is turned in the counterclockwise direction, to its original position. After the rotation of the arm 29, the arms 79 and 77 are turned in the counterclockwise and clockwise directions, respectively, to their original positions, by the forces of the springs 80 and 79. The rotation of the arm 79 causes the microswitch 81 to be released, and thereby changed over from the contact b to the contact a.

Consequently, the apparatus is changed over from the auto rewind mode to its original stop mode.

Next, if the tape does not reach the end thereof when the apparatus is changed over from the fast-forward mode to the stop mode, the circuit 133 does not send an output signal to the circuit 134. The current from the power source is supplied to the circuit 134 through the microswitches 53 and 81. The circuit 134 is operated to activate the circuit 130 once for an extremely short period of time.

The rotation of the arm 29 in the clockwise direction, due to the activation of the solenoid 28, turns the arm 79 in the same direction and pushes the microswitch 81. Simultaneously, the arm 77 is turned in the counterclockwise direction and unlocks the arm 75. The arm 75 is turned in the clockwise direction and stops the pushing against the microswitch 81. Immediately, thereafter, the current supply to the solenoid 28 is cut off as described hereinbefore. The arms 29, 79 and 77 are returned to their respective original positions. The microswitch 81 is changed over from the contact b to the contact a and is returned to its original state. Consequently, the apparatus assumes its original stop mode. If the apparatus assumes one of the recording, play, fast-forward, and rewind modes, the circuits 130 and 131 are supplied from the power source by way of the microswitches 53 and 50, and contacts b, whereby the selected mode is performed. The circuit 134 is cut off from the power source by the microswitch 53 connected to the contact b and is rendered inoperative irrespective of the "ON" and "OFF" states of the microswitch 81.

9. Brake Mechanism

The operation of the brake mechanism in the recording or play mode will be described first.

The knob 24 is turned in the counterclockwise direction, the arm 25 turns in the clockwise direction, and the arm 117 turns in the counterclockwise direction. The turning of the arm 117, turns the arm 110 in the clockwise direction. The braking force against the disc 95 by the brake shoe 114 is removed. The arm 111 is rotated in the clockwise direction through the rod 116. After the rotation of the arm 110, the braking force against the reel holder 157 by the brake shoe 115 is removed.

In the loading operation, the pin 66 is moved in the direction of the arrow C. The arm 64 is turned in the counterclockwise direction. The arm 119 is released from its engagement with the pin 64c and is rotated in the clockwise direction by the force of the spring 120. The brake shoe 115 is pressed against the holder 100 to apply braking force thereto. The braking force against the holder 100 is removed by the aforementioned brake shoe 121, with a slight delay due to the play in the movement of the rod 116.

Accordingly, during the loading operation, the holder 100 is stopped by the effect of the brake shoe 121 despite the rotational force transmitted from the three-stage pulley 90. All of the tape is drawn out of the supply reel of the cassette 11.

Upon completion of the loading operation, the pinch roller (not shown) is pressed against the capstan for driving and running the tape. In response to this operation, the arm 119 is turned in the counterclockwise direction, to remove the braking force against the holder 100 by the brake shoe 121. Accordingly, the take-up reel of the cassette 11 rotates in the tape take-up direction responsive to the transmission of the rotational force of the reel drive motor (not shown) by way of the roller 90a of three-stage pulley 90, disc 107, felt members 108 and 109, disc 104, and reel holder 157. Thus, the apparatus assumes the recording or reproducing mode.

Next, during the tape unloading mode, arm 25 is locked by the cam 62, and the arms 110 and 111 are both held to remove the braking force as described hereinbefore. The pinch roller separates from the capstan and causes the arm 119 to turn in the clockwise direction. The brake shoe 121 presses against the holder 100, and a braking force is imparted thereto. As a result of this operation, the tape is wholly wound around the supply reel of the cassette 11, and the tape is not paid out of the take-up reel.

When the pin 66 strikes against the arm 64, slightly before the end of unloading operation, the arm 25 is released from the cam 62 and is turned in the counterclockwise direction. Then, the arm 117 is turned in the clockwise direction, when released from engagement with the arm 25. The rotation of the arm 117 causes the arms 110 and 111 to be turned in the counterclockwise direction by the force of the springs 112 and 113. The brake shoes 114 and 115 are pressed against and brake the disc 95 and the holder 157, respectively. The rotation of the arm 64 in the clockwise direction causes the arm 119 to be turned in the counterclockwise direction by the abutment of the arm 64. The brake shoe 121 moves away from the holder 100, to remove the braking force. Consequently, the apparatus is changed over from the unloading mode to the stop mode.

Next, the operation of the brake mechanism during the fast-forward or rewind mode is described below.

The turning of the cam 18 shifts the arm 25, and the arms 110 and 111 are both turned in the clockwise direction. The brake shoes 114 and 115 are separated to remove braking from the disc 95 and the reel holder 100, respectively. At the same time, the arm 119 is not shifted, whereby the brake shoe 121 is separated from the holder 157. Accordingly, during the fast-forward mode, the take-up reel of the cassette 11 is rotated at a high speed in the tape take-up direction by the rotational force of the pulley 88, transmitted by way of the three-stage pulley 90, belt 74, pulley 73, disc 104, reel holder 157, and the like. The apparatus assumes the fast-forward mode. During the rewind mode, the supply reel of the cassette 11 is rotated at a high speed in the tape take-up direction by the rotational force of the pulley 88, whereby the apparatus assumes the rewind mode.

Next, the operation of the brake mechanism during the auto rewind mode will be described.

In this state, the turning of the arm 29 rotates the arm 117 in the counterclockwise direction, and the arms 110 and 111 are both turned in the clockwise direction. Therefore, the brake shoes 114 and 115 are separated from the disc 95 of the holder 92 and the reel holder 157, to remove the braking force. The arm 117 is not shifted, whereby the brake shoe 121 is kept apart from the holder 157. Accordingly, the supply reel of the cassette 11 is rotated as during unloading mode, whereby the apparatus is placed in the auto rewind mode.

10. Timer Recording Apparatus

A circuit diagram of one embodiment of the timer recording apparatus, incorporated into the recording and reproducing apparatus shown in FIG. 1, is illustrated in FIG. 25. In FIG. 25, constituent parts similar to those illustrated in FIG. 1 are designated by the same reference numerals.

The microswitch 41 is normally connected to a contact *a* to which power from an apparatus power source 140 is being supplied. When switched to contact *b*, the timer recording adapter power source 141 is energized. The microswitch 53 is normally connected to a contact *a* and is switched over to contact *b* and an input terminal 142 of the electric circuit of the apparatus. A normally open timer switch 143 is closed by the timer device (not shown) of the apparatus.

The button 161 is pushed and the slide plate 35 slides in the direction of the arrow B. As a result, the arm 39 is released. The pin 39*a* thereof slidably slides on the cam surface 35*d* of the slide plate 35 by the force of the spring 40. Arm 39 is rotated in the clockwise direction. Furthermore, the microswitch 41 is pushed by the slide plate 35 and switched from the contact *a* to contact *b*. As another result of the sliding of the slide plate 35, the lever 42 slides slightly toward the right, and then is returned in the opposite direction, thereby engaging the bent portion 35*f* with the hook portion 42*f* and locking the slide plate 35 at the position to which it has slid.

When the knob 24 is rotated in the counterclockwise direction, the cams 20, 22, 24, and 18 are all turned in the same direction as described hereinbefore. The apparatus assumes the recording mode. However, the current from the power source 140 is cut off by the microswitch 41 switched over to the contact *b* and is not supplied to the terminal 142 of the apparatus electric circuit, whereby the apparatus is not operated. Furthermore, at this time, as a result of the rotation of the arm 39 in the clockwise direction, the cam 18 engages the arm 39 and is locked, thereby being held at the operated position. Consequently, the apparatus is held in a state wherein the timer recording operation is possible.

Accordingly, when the present time arrives in the timer mechanism, the switch 143 is closed. The current from the power source 141 is supplied, by way of the microswitches 41 and 53 connected to the contact *b* respectively, to the terminal 142 of the electric circuit of the apparatus. Consequently, the apparatus is changed over to the recording mode via the loading mode.

At the same time, in response to the supply of current to the terminal 142, the solenoid 28 is activated and the arm 29 is turned in the clockwise direction. As a result of the rotation of the arm 29, the lever 42 slides toward the right. The slide plate 35 is released from its locked state by the lever 42 and is returned to its original position by the force of the spring 38. When the slide plate 35 returns to its original position, the cam 39 is rotated in the counterclockwise direction. The cam 18 is released by the hook portion 39*c*. At this moment, the cam 18 is being locked by the rotated arm 29 and is thereby held in its operative position. Moreover, the return of the slide plate 35 to its original position causes the microswitch 41 to be changed over from the contact *b* to contact *a*. Consequently, the apparatus is placed in the normal recording mode, as described hereinbefore, by the current fed from the power source 140.

While the apparatus continues operating in the recording mode, the arrival of the tape end causes the aforementioned circuit 133 to be activated so as to terminate the current supply to the solenoid 28, by cooperation of the circuit 130, whereby the apparatus is changed over, by way of the loading mode, to the stop mode, as described hereinbefore.

When the aforementioned timer recording mode is to be released manually, the button 160 is manipulated and pushed so that the slide plate 45 slides in the direction of the arrow B. This sliding of the plate 45 causes the arm 49 to be turned in the clockwise direction, and the lever 42 slides in the rightward direction. Thus, the apparatus is changed over from the timer recording mode to the stop mode.

Further, this invention is not limited to these embodiments but variations and modifications may be made without departing from the scope and spirit of the invention.

What is claimed is:

1. A recording and/or reproducing apparatus of the type using a tape cassette containing a recording tape therewithin, said apparatus comprising:

means for drawing the tape out of the cassette and placing the tape in a predetermined tape level path at the time of loading the apparatus and for replacing the tape in the tape travel path back into the cassette at the time of unloading the apparatus;

a fast-forward operation mechanism for placing the apparatus in a fast-forward mode responsive to controllable manipulation;

fast-forward drive means operated responsive to the fast-forward control mechanism being thus manipulated to place the apparatus in the fast-forward mode operational state;

a rewind operation mechanism for placing the apparatus in a tape rewind mode responsive to controllable manipulation;

rewind drive means operated responsive to manipulation of the rewind control mechanism to place the apparatus in the tape rewind mode operational state;

locking means for locking the fast-forward control mechanism and the rewind control mechanism in their respective manipulated states; and control means for maintaining unoperated the fast-forward drive means or the rewind drive means at the time when the apparatus is in the unloading mode despite the locked manipulated state of the fast-forward control mechanism or the rewind control mechanism and for maintaining unoperated said mechanism upon completion of the unloading operation of the apparatus.

2. A recording and/or reproducing apparatus as claimed in claim 1 and a supply reel disc assembly, a tape-up reel disc assembly, said assemblies being respectively adapted to receive a supply reel and a take-up reel contained within the tape cassette; the fast-forward drive means and the rewind drive means comprising rotation transmitting means for transmitting rotational power respectively to the take-up reel disc assembly and the supply reel disc assembly; and the operation control means comprising holding means for holding unoperated the rotation transmitting means while the apparatus is in the unloading mode.

3. A recording and/or reproducing apparatus as claimed in claim 2 wherein said means for drawing tape out of and replacing the tape into the tape cassette comprises a tape engaging member operating together with the start of the tape loading operation to engage the tape and draw the same out of the cassette and to move back to its original position upon completion of the unloading operation of the apparatus prior to the start of loading; and the holding means comprises release means for holding unoperated the rotation transmitting means when the tape engaging member is not in its original position and for engaging the tape engaging member thereby to release the rotation transmitting means from the unoperated state when the tape engaging member is in its original position.

4. A recording and/or reproducing apparatus as claimed in claim 1 further comprising: a supply reel disc assembly for engaging a supply reel and a take-up reel disc assembly for engaging a take-up reel within the tape cassette; first and second brake means for applying a braking force respectively to the supply reel disc assembly and the take-up reel disc assembly when said apparatus is in a stop mode and for not applying braking force to said assemblies when said apparatus is in operational modes other than the stop mode; and third brake means for applying braking force to the take-up reel disc assembly at the time of loading and unloading modes of the apparatus.

5. A recording and/or reproducing apparatus as claimed in claim 1 further comprising detecting means for detecting each of the terminal ends of the tape and producing a detection output and rewind means operated responsive to the detection output when the detecting means detects a tape end at while the apparatus is in the tape fast-forward mode to automatically rewind a specific quantity of the tape.

6. A recording and/or reproducing apparatus as claimed in claim 1 in which the locking means comprises a first locking means for locking the fast-forward control mechanism or the rewind control mechanism while in the manipulated state thereof, solenoid means for actuating the first locking means, a second locking means for holding the first locking means in a locking operational state, means for reducing the current passing through the solenoid interrelatedly with the operation of the first locking means, and unlocking means for terminating the locking operation of the second locking means by deenergizing the solenoid.

7. A recording and/or reproducing apparatus as claimed in claim 1 further comprising a main power source means for supplying power to the apparatus, an auxiliary power source means, a timer switch means connected to the auxiliary power source means and effecting circuit closure at a preset time, and changeover means operating when supplied with power from the auxiliary power source means as a result of the closure of the timer switch means to actuate a switch and thereby to cause power to be supplied from the main power source means to the apparatus.

8. A recording and/or reproducing apparatus as claimed in claim 1 and a supply reel disc assembly comprising a supply reel holder for engaging a supply reel within the tape cassette and means comprising a first disc rotating unitarily with said supply reel holder; a take-up reel disc assembly comprising a take-up reel holder for engaging a take-up reel within the tape cassette and means comprising a second disc rotating unitarily with said take-up reel holder; the fast-forward drive means having a first rotation transmitting means for transmitting rotational power to the second disc of the take-up reel disc assembly with rotation in a direction of winding the tape around the take-up reel in a fast-forward mode; the rewind drive means having a second rotation transmitting means for transmitting rotational power to the first disc of the supply reel disc assembly with rotation in a direction of winding the tape around the supply reel in a tape rewind mode; and the operation control means having holding means for holding the first or second rotation transmitting means in an unoperated state at the time when the apparatus is in the unloading mode.

9. A recording and/or reproducing apparatus as claimed in claim 8 in which the means for drawing the tape out of and replacing the tape into the cassette includes a tape engaging member which is operated at the start of the tape loading operation to engage and draw the tape out of the cassette, and upon completion of the unloading operation of the apparatus, to move to the original position which it operated prior to the start of loading; and the holding means including release means for holding the first or second rotation transmitting means unoperated while the tape engaging member is not in its original position and for engaging the tape engaging member to release the first or second rotation transmitting means from its unoperated state when the tape engaging member is in its original position.

* * * * *